March 1, 1927.
R. R. RICKETTS
1,619,315
DISPENSING RECEPTACLE
Filed Oct. 29, 1926
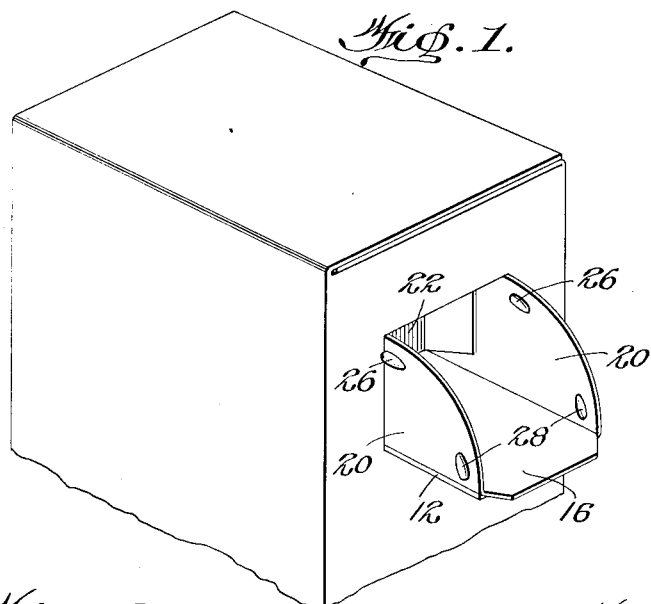
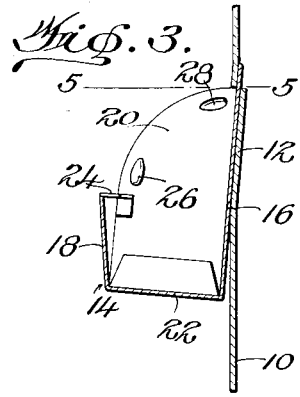
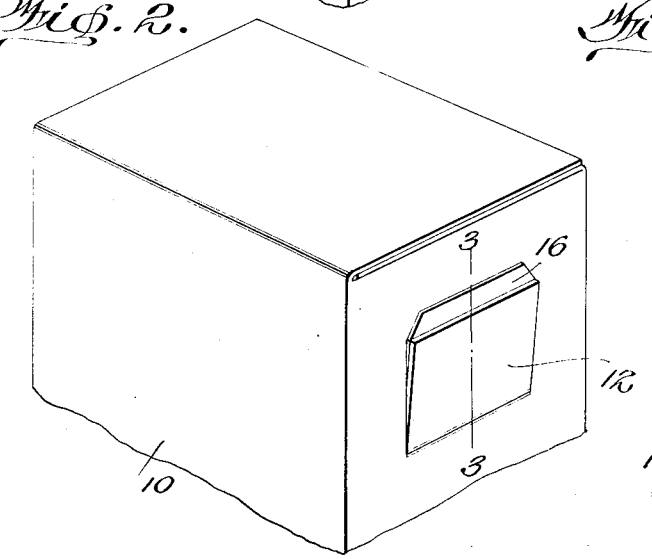
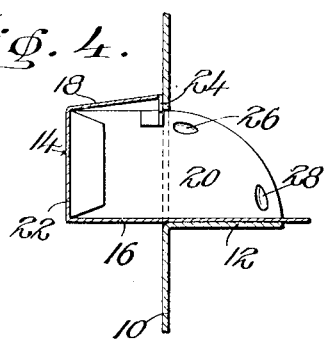
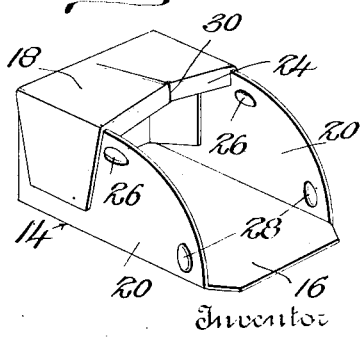
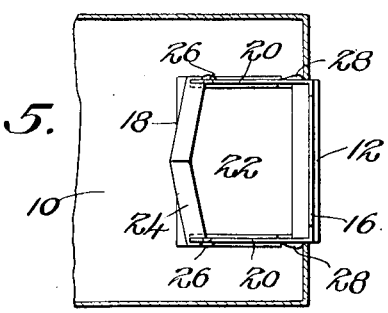
Inventor
R. R. Ricketts,
by Bright & Bailey.
Attorneys Patented Mar. 1, 1927.

1,619,315

UNITED STATES PATENT OFFICE.

RICHARD R. RICKETTS, OF SPRINGFIELD, MISSOURI.

DISPENSING RECEPTACLE.

Application filed October 29, 1926. Serial No. 144,987.

My invention relates to dispensing receptacles of the general type wherein means is associated directly with a receptacle for effecting delivery of a predetermined portion of its contents, and my purpose, generally speaking, is to provide improvements in the construction of a dispensing receptacle of this type as illustrated, described and claimed in my prior application, Serial Number 112,299, filed May 28, 1926.

More particularly it is my purpose to provide a dispensing receptacle in the form of a carton having an opening in a wall thereof and having a measuring cup hinged thereto for movement through said opening to two positions, in one of which it may receive material contained in the carton and in the other of which it may deliver material contained therein to the exterior of the carton, all as disclosed in my aforesaid prior application, and in addition it is my purpose to provide positive means for holding the measuring cup in each of its aforesaid two positions, and to provide means for causing surplus contents in the measuring cup to run off therefrom when movement of the cup from its position first mentioned to its position last mentioned is initiated, whereby the device will measure accurately, said last named means being intended also to serve the purpose of preventing the contents of the receptacle from lodging between the wall of the receptacle and the cup and to permit the cup to close the opening in the wall of the receptacle tightly when the cup is in its dispensing position.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Fig. 1 is a perspective view of the upper end of a receptacle showing my improvements embodied therein, the measuring cup being shown in position to effect delivery of a portion of the contents of the receptacle;

Fig. 2, a view similar to Fig. 1 showing the measuring cup in position to be filled from the contents of the receptacle;

Fig. 3, a section on the line 3—3 of Fig. 2;

Fig. 4, a view similar to Fig. 3 with the parts in the position shown in Fig. 1;

Fig. 5, a section on the line 5—5 of Fig. 3; and

Fig. 6, a perspective view of the measuring cup.

Referring to the drawings in detail, 10 indicates the upper end of a carton formed of cardboard or similar material and of the usual shape and construction incident to cartons employed in distributing seeds to the trade. In one side wall of the carton 1 cut an inverted U-shaped slit to form a flap 12 adapted to swing outwardly and downwardly with respect to the carton.

The measuring and dispensing element 14 of my receptacle is formed preferably from a single blank of relatively thin, stiff, flexible material, such as fibre board, and it consists of a cup embodying opposite long and short sides 16, 18, respectively, other corresponding opposite sides 20, 20 and a bottom 22. The sides 20, 20 extend beyond the free end of the short side 18 to points adjacent to the free end of the long side 16 and the free edges of said sides 20, 20 are curved between the free ends of the long and short sides 16, 18 on arcs of circles struck from centers approximately midway between the ends of the long side 16. The short side 18 is of slightly greater width at its free end than the width of the long side 16, so that normally the free edges of the sides 20, 20 are maintained by the free end portion of the short side 18 slightly bulged outward. The short side 18 is capable of being bulged outwardly, however, as shown in Fig. 6 to permit the free edge portions of the sides 20, 20 to be moved towards one another, but as is apparent, if the force imposed on the sides 20, 20 for moving them towards one another is removed, the short side 18, due to its flexibility and greater width at its free end than the long side 16, will act to restore the normal outward bulged status of the free edge portions of said sides 20, 20. The free end of short side 18 terminates in an inwardly directed flap 24 and each of the sides 20, 20 has pressed outwardly therefrom, near its curved edge, a pair of protuberances 26, 28, the former of which is disposed adjacent to the free end of the short side 18 and the latter of which is disposed adjacent to the long side 16.

The outer face of the long side 16 of the measuring and dispensing element or cup 14 is secured in any suitable manner against the inner face of the flap 12 in such position that when flap 12 is swung to its closed position, as shown in Figs. 2 and 3, the cup will be disposed within the receptacle 10 with its open end uppermost, and when the flap 12 is swung outwardly, the cup will be disposed, as shown in Figs. 1 and 4, to dispense its contents exteriorly of the receptacle.

The sides 20, 20 of the cup are of the same height, and the side 16 is of the same width as the opening in the receptacle formed by cutting the flap 12 therefrom, so that the short side 18 constantly tends to force the sides 20, 20 outward against the carton wall at the sides of the opening therein, and when the cup is in its dispensing position shown in Figures 1 and 4, the inwardly directed flap 24 at the free end of the short side 18 lies against the inner face of the carton wall directly above the opening therein and serves to limit opening movement of the cup through said opening. When the cup is in its filling position shown in Figures 2, 3 and 5, the protuberances 28 engage the inner face of the carton wall at opposite edges of the opening therein through which the cup is movable and serve positively to prevent swinging movement of the cup through said opening to a dispensing position. On the other hand, when the cup is in its dispensing position shown in Figures 1 and 4, the protuberances 26 engage the outer face of the carton wall at opposite edges of the opening therein through which the cup is movable and serve positively to prevent swinging movement of the cup through said opening to a filling position. The flexibility of the short side 18 permits the sides 20, 20 to yield towards one another to permit the protuberances 26, 28 to pass through the opening in the carton wall.

The long side 16 of the cup extends at its free end slightly beyond the free ends of the side walls 20, 20, so as to overlie the top edge of the opening in the carton to effectively seal said opening when the cup is in its filling position, the free end portion of said longer side 16 providing a tab exteriorly of the carton when the cup is in its filling position to be grasped to initiate movement of the cup to a dispensing position.

When the cup is in its filling position the carton is inverted and then restored to a normal upright position or it is otherwise suitably manipulated to fill the cup from the contents thereof. The cup then may be swung to its position shown in Figures 1 and 4 to dispense its contents. When it is swung to its latter position the flap 24 abuts the inner face of the carton wall above the opening therein and serves not only as a stop to limit further swinging movement of the cup in an opening direction, but serves also to effectively seal the opening in the carton wall against passage of the carton contents past the cup through said opening. This flap moreover serves to prevent overfilling of the cup by causing surplus contents to run off therefrom and thus serves to cause the cup to effect accurate measuring.

In order that the short side 18 may function to hold the sides 20, 20 against the side edges of the opening in the carton wall and to yield to permit the protuberances 26, 28 to move past the side edges of said opening, the flap 24 is slitted at one or more places as indicated at 30 in Fig. 6 of the drawings.

From the foregoing description considered in connection with the accompanying drawings, it is believed that the construction, operation and advantages of my improved dispensing receptacle will be clearly understood. I desire to point out, however, that various changes and desirable additions may be made in and to the structure shown within the spirit and scope of my invention as defined in the appended claims.

I claim:

1. In a device of the character described, a receptacle having an opening in a wall thereof, a measuring cup pivoted to the receptacle for swinging movement through said opening to either of two positions, in one of which it may receive material contained in the receptacle and in the other of which it may deliver material contained therein to the exterior of the receptacle, and cooperative means associated with said cup and receptacle wall, in addition to the normal frictional engagement between the walls of said cup and said receptacle wall, serving to hold said cup against accidental swinging movement from either of its aforesaid two positions towards the other position thereof.

2. In a device of the character described, a receptacle having an opening in a wall thereof, a measuring cup pivoted to the receptacle for swinging movement through said opening to either of two positions, in one of which it may receive material contained in the receptacle and in the other of which it may deliver material contained therein to the exterior of the receptacle, and cooperative means associated with said cup and receptacle wall, in addition to the normal frictional engagement between the walls of said cup and said receptacle wall, serving to hold said cup against accidental swinging movement from its first named position towards its second named position.

3. In a device of the character described, a receptacle having an opening in a wall thereof, a measuring cup pivoted to the receptacle for swinging movement through said opening to either of two positions, in one of which it may receive material contained in the receptacle and in the other of which it may deliver material contained therein to the exterior of the receptacle, and cooperative means associated with said cup and receptacle wall, in addition to the normal frictional engagement between the walls of said cup and said receptacle wall, serving to hold said cup against accidental swinging movement from its second named position towards its first named position.

4. In a device of the character described, a receptacle having an opening in a wall thereof, a measuring cup pivoted to the receptacle for swinging movement through said opening to either of two positions, in one of which it may receive material contained in the receptacle and in the other of which it may deliver material contained therein to the exterior of the receptacle, and cooperative means associated with said cup and receptacle wall, in addition to the normal frictional engagement between the walls of said cup and said receptacle wall, serving to hold said cup against accidental swinging movement in either direction from either of its aforesaid two positions.

5. In a device of the character described, a receptacle having an opening in a wall thereof, a measuring cup pivoted to the receptacle for swinging movement through said opening to either of two positions, in one of which it may receive material contained in the receptacle and in the other of which it may deliver material contained therein to the exterior of the receptacle, and cooperative means associated with said cup and receptacle wall, in addition to the normal frictional engagement between the walls of said cup and said receptacle wall, serving to hold said cup against accidental swinging movement in either direction from its first named position.

6. In a device of the character described, a receptacle having an opening in a wall thereof, a measuring cup pivoted to the receptacle for swinging movement through said opening to either of two positions, in one of which it may receive material contained in the receptacle and in the other of which it may deliver material contained therein to the exterior of the receptacle, and cooperative means associated with said cup and receptacle wall, in addition to the normal frictional engagement between the walls of said cup and said receptacle wall, serving to hold said cup against accidental swinging movement in either direction from its second named position.

7. In a device of the character described, a receptacle having an opening in a wall thereof, a measuring cup pivoted to the receptacle for swinging movement through said opening to either of two positions, in one of which it may receive material contained in the receptacle and in the other of which it may deliver material contained therein to the exterior of the receptacle, a side of said cup being flexible, and protuberances on said side engageable with said receptacle wall to hold said cup against accidental swinging movement from either of its aforesaid two positions towards the other position thereof.

8. In a device of the character described, a receptacle having an opening in a wall thereof, a measuring cup pivoted to the receptacle for swinging movement through said opening to either of two positions, in one of which it may receive material contained in the receptacle and in the other of which it may deliver material contained therein to the exterior of the receptacle, a side of said cup being flexible, and a protuberance on said side engageable with said receptacle wall to hold said cup against accidental swinging movement from its first named position towards its second named position.

9. In a device of the character described, a receptacle having an opening in a wall thereof, a measuring cup pivoted to the receptacle for swinging movement through said opening to either of two positions, in one of which it may receive material contained in the receptacle and in the other of which it may deliver material contained therein to the exterior of the receptacle, a side of said cup being flexible, and a protuberance on said side engageable with said receptacle wall to hold said cup against accidental swinging movement from its second named position towards its first named position.

In testimony whereof I hereunto affix my signature.

RICHARD R. RICKETTS.